(12) United States Patent
Bloecher (10) Patent No.: US 9,089,892 B2
(45) Date of Patent: Jul. 28, 2015

(54) JOINING METHOD

(71) Applicant: NEWFREY LLC, Newark, DE (US)

(72) Inventor: Michael Bloecher, Giessen (DE)

(73) Assignee: NEWFREY LLC, Newark, DE (US)

( * ) Notice: Subject to any disclaimer, the term of this patent is extended or adjusted under 35 U.S.C. 154(b) by 192 days.

(21) Appl. No.: 13/733,938

(22) Filed: Jan. 4, 2013

(65) Prior Publication Data

US 2013/0139370 A1 Jun. 6, 2013

Related U.S. Application Data

(63) Continuation of application No. PCT/EP2011/060457, filed on Jun. 22, 2011.

(51) Int. Cl.
*B21J 15/28* (2006.01)
*B21J 15/02* (2006.01)
*B21D 39/03* (2006.01)
*B23K 9/20* (2006.01)

(52) U.S. Cl.
CPC .............. *B21J 15/02* (2013.01); *B21D 39/031* (2013.01); *B21J 15/025* (2013.01); *B21J 15/285* (2013.01); *B23K 9/206* (2013.01); *Y10T 29/49776* (2015.01)

(58) Field of Classification Search
CPC ........ B21J 15/02; B21J 15/285; B21J 15/025; B23K 9/206; B21D 39/031; Y10T 29/49776
USPC .............. 29/407.08, 243.525, 407.05, 524.1, 29/716, 243.519, 243.53, 407.01; 72/21.1, 72/21.4
See application file for complete search history.

(56) References Cited

U.S. PATENT DOCUMENTS

| | | | |
|---|---|---|---|
| 5,502,884 A * | 4/1996 | Ladouceur | 29/407.05 |
| 5,661,887 A * | 9/1997 | Byrne et al. | 29/243.525 |
| 6,543,115 B1 * | 4/2003 | Mauer et al. | 29/407.05 |
| 6,961,984 B2 * | 11/2005 | Naito et al. | 29/407.08 |
| 7,503,196 B2 * | 3/2009 | Chitty et al. | 72/21.4 |

(Continued)

FOREIGN PATENT DOCUMENTS

| | | |
|---|---|---|
| CN | 101449988 A | 6/2009 |
| EP | 0 738 550 A2 | 10/1996 |

(Continued)

OTHER PUBLICATIONS

Chinese Search Report dated May 19, 2014; 2 pp.

(Continued)

*Primary Examiner* — David Bryant
*Assistant Examiner* — Jun Yoo
(74) *Attorney, Agent, or Firm* — Harness, Dickey & Pierce, P.L.C.

(57) ABSTRACT

Joining method, in particular for connecting at least two workpieces, in which during a joining operation the profile (F) of a force exerted by a joining tool is recorded and compared with a reference force profile ($F_R$) in order to be able to check the quality of the joined connection produced, the difference (Δ) between the force profile (F) and the reference force profile ($F_R$) being formed, and at least one segment (A; B) of the difference profile (ΔF) thereby determined being mapped numerically onto a quality value (QW).

10 Claims, 3 Drawing Sheets

(56) References Cited

U.S. PATENT DOCUMENTS

| | | |
|---|---|---|
| 2004/0148761 A1 | 8/2004 | Naito et al. |
| 2007/0033788 A1 | 2/2007 | Chitty et al. |
| 2007/0124911 A1 | 6/2007 | Lang et al. |
| 2008/0250832 A1* | 10/2008 | Sanchez-Brunete Alvarez .................. 72/17.3 |

FOREIGN PATENT DOCUMENTS

| | | |
|---|---|---|
| JP | 09-144728 | 6/1997 |
| JP | 11-90575 | 4/1999 |
| JP | 2003-001360 | 1/2003 |
| JP | 2003-103337 | 4/2003 |
| JP | 2007-530286 | 11/2007 |
| JP | 2007-530287 | 11/2007 |
| WO | WO03000445 | 1/2003 |
| WO | WO2005095019 | 10/2005 |
| WO | WO2005097375 | 10/2005 |
| WO | WO2006014675 | 2/2006 |

OTHER PUBLICATIONS

Notification of Reason for Rejection dated Jan. 7, 2015 in corresponding Japanese Patent Application No. 2013-517192, with English translation.

* cited by examiner

JOINING METHOD

CROSS-REFERENCES TO RELATED APPLICATIONS

This application is a continuation of international patent application PCT/EP2011/060457, filed Jun. 22, 2011 designating the U.S., which international patent application has been published in English and claims priority from German patent application DE 10 2010 027 195.0, filed on Jul. 7, 2010. The entire contents of these prior applications are incorporated herein by reference.

BACKGROUND OF THE INVENTION

The present invention relates to a joining method, in particular for connecting at least two workpieces, in which during a joining operation the profile of a force exerted by a joining tool is recorded and compared with a reference force profile in order to be able to check the quality of the joined connection produced.

Joining methods of this type are generally known, for example in the form of a self-piercing riveting method, a clinch-joining method or a solid riveting method. In the case of these joining methods, but also of other types of joining methods, the profile of a force exerted by a joining tool is recorded and compared with a previously recorded reference force profile. The reference force profile is stored during the carrying out of an exemplary joining method. It is known in this case to define a so-called envelope curve in relation to this reference force profile. Here, the reference force curve is shifted by a specific absolute value in the positive direction in order to define an upper threshold curve. Correspondingly, the reference force profile is shifted by a specific absolute value into the negative in order to define a lower threshold curve. The two threshold curves form the envelope curve. Subsequent joining operations are recorded with regard to the force profile and plotted in a diagram in common with the envelope curve. It is therefore possible to determine visually for each joining operation whether the force profile of the joining operation carried out has remained within the envelope curve. If this is the case, the quality of the joined connection produced is judged to be good. Otherwise, the quality is judged to be poor and a defect signal or similar is output.

This type of defect monitoring is relatively inflexible, and it is only by visual comparison of a plurality of such diagrams that it is possible to detect a trend that points, for example, to an increase in wear, fatigue phenomena or the like.

Document DE 197 31 222 B4 discloses a method for forming a self-piercing riveted joint in the case of which a force of a punch and of a hold-down is measured as a function of the travel of the punch or of the hold-down, and an actual profile is determined, a signal being triggered when the determined actual profile deviates from a desired profile in at least one prescribed range about a prescribed limit value.

It is the object of the invention to specify an improved joining method against this background.

SUMMARY OF THE INVENTION

This object is achieved by a joining method, in particular for connecting at least two workpieces, in which during a joining operation the profile of a force exerted by a joining tool is recorded and compared with a reference force profile in order to be able to check the quality of the joined connection produced, the difference between the force profile and the reference force profile being formed, and at least one segment of the difference profile thereby determined being mapped numerically onto a quality value.

Thus, according to the invention each joined connection produced is allocated at least one numerical quality value that can, for example, be compared with a previously determined quality threshold value in order to determine whether the joined connection produced is in order or not in order. In addition, the consequence of mapping onto a numerical quality value is that the latter can be stored for a multiplicity of consecutively performed joining operations and subsequently evaluated statistically. Furthermore, it is possible to detect a trend from a plurality of quality values by means of simple numerical methods (for example calculation of the gradient or the like). For example, given increasing wear of a component the quality value will move in a specific direction, whereas given a plurality of proper joining operations the quality value is preferably scattered about a permissible mean. Energy is input into the joined connection by the exertion of the force during the joining operation. The formation of the difference between the force profile and the reference force profile therefore preferably corresponds to the formation of an energy deviation.

By way of example, the force profile can be the profile of the force plotted against the travel of the joining tool. Alternatively, it is also possible to plot the profile of the force against time.

Generally speaking, in terms of profile it is also possible to record other types of physical parameters than force and evaluate them with the aid of the inventive method. For example, the parameter can be the temperature in the case of a welding operation, or similar.

The inventive method can be used not only to visualize the quality of a joining operation, but also to reduce the quality to at least one numerical quality value such that subsequent evaluation in a control unit or the like is simplified. Furthermore, a plurality of quality values can be used to perform a statistical evaluation, for example in order to display trends that indicate the wear or deposits on a joining tool such as a die or a punch, or the breakage of a joining tool such as a die or a punch.

Furthermore, the inventive method enables the targeted assessment only of specific areas of the joining operation and mapping in a quality value or characteristic value. In particular, it is possible hereby to compare critical areas of a joining operation with other threshold values than less critical areas of the joining operation. In other words, it is possible to map a plurality of segments or phases of a joining operation onto a respective quality value. For example, it is possible to determine a quality value for a phase of mounting a joining component, a quality value for a phase of deep drawing, a quality value for a phase of spreading (undercutting), and/or a quality value for a phase of pressing a joined connection.

Finally, the inventive method enables not only a statistical evaluation of a specific joining operation, but also a statistical evaluation of a plurality of joining operations carried out by means of the same joining tool and possibly being different, such that a conclusion may be reached as to the quality of the joining tool.

The joining method can be a method for connecting two workpieces such as, for example, metal sheets, it being possible to produce the connection without the use of a joining component (such as, for example, when clinching) or with the use of a joining component (such as, for example, in the case of self-piercing riveting). Furthermore, by way of example the joining method also covers those joining operations in which a joining component is connected to a workpiece (for example, a self-piercing rivet with a section projection from the workpiece in the manner of a fastening bolt).

In any case, the joining profile can be stored in analogue or else digital fashion.

The object is therefore completely achieved.

It is particularly advantageous when the mapping of the segment of the difference profile onto a quality value includes an integration of the difference profile.

It is numerically comparatively easy to implement an integration of the difference profile. In addition, for a profile of force plotted against travel, for example, the integral of the difference profile corresponds largely to the energy deviation that has been mentioned above.

In accordance with a further embodiment, the mapping includes a sum of powers such as, for example, squares of the difference profile.

In the case of this type of mapping, use is made of the concept of error squares in which it is possible to take greater account of large deviations than relatively small deviations.

Generally speaking, it is also possible to take greater account of (to weight) relatively large deviations when integrating the difference profile.

In accordance with a further preferred embodiment, a first mapping maps positive value segments of the difference profile into a first quality value, and a second mapping maps negative value segments of the difference profile into a second quality value.

It has been shown that a separate consideration of positive deviations and negative deviations enables greater informativeness in relation to the quality of the joined connection.

Furthermore, it is preferred when the joining operation is carried out repeatedly, and when the respective quality values are represented in a diagram of quality value plotted against the number of the joining operation.

It is possible in this way to detect a trend resulting for this type of joining operation in an optically simple fashion.

In accordance with a further preferred embodiment, a plurality of different joining operations are carried out repeatedly, the respective quality values being represented in a diagram of quality value plotted against the number of the joining operation.

In the case of this embodiment, it is possible not only to assess a specific joining operation. Rather, it is possible to undertake an evaluation extending over joining operations which relates to the quality of the joining tool.

Overall, it is, furthermore, advantageous when the mapped segment of the force profile includes a segment or phase in the case of which a deformation of a workpiece and/or of a joining component used in the joining operation is performed by means of the joining tool.

Such a deformation is performed, for example, in the case of so-called self-piercing riveting and in the case of clinching. Deformation of the workpiece (stamped-through portions therein) and, if appropriate, slight deformation of the joining component (rivet) also take place in so-called solid riveting methods.

Furthermore, it is advantageous overall when the mapped segment of the force profile includes a segment in which a joining component to be used during the joining operation is shifted out of a receiver into an initial joining position by means of the joining tool.

Joining tools of the type mentioned at the beginning are frequently supplied, in an automated manner with joining components (such as, for example, self-piercing rivets) by means of a feeder arrangement. Here, the joining component is fed into a receiver of a joining head and subsequently, by way of example, moved out of this position into an initial joining position (for example, in a fashion bearing against workpieces to be interconnected) by means of a punch.

To the extent, for example, that the joining component is rotated or tilted during this process, it is possible to carry out inadvertently joining processes whose quality is poor or that can lead to a breakage of parts of the joining tool, etc.

Such defective joining operations can be avoided by monitoring the segment of the force profile in which the joining component is shifted. The point is that with the aid of the quality value the inventive method can detect whether a joining component is being shifted in a correct position or in a tilted or otherwise displaced position.

It is particularly advantageous in this case when the joining tool is moved by means of an actuator arrangement in order to shift the joining component out of the receiver into the initial joining position.

The actuator arrangement can be a spring arrangement, but can also be a pneumatic arrangement, a hydraulic arrangement, or arrangement with an electric motor. If the friction occurring with the displacement of the joining component is neglected, because of the increasing actuator effect the result in general is an approximately linear force profile that can be compared with a reference force profile, the difference between which can be mapped numerically onto a quality value. This quality value then provides information as to whether the joining component has the correct alignment in the initial joining position.

The point is that whenever it is shifted into a tilted or otherwise offset position, the joining component is slightly deformed, and this can result in a slight increase in force that can be determined by the inventive process evaluation.

It has emerged that such monitoring of the joining process is possible despite the fact that the forces required to shift the joining component are relatively small in comparison with the forces that occur during the actual deformation operation.

It goes without saying that the abovementioned features and those still to be explained below can be used not only in the respectively specified combination, but also in other combinations or on their own without departing from the scope of the present invention.

BRIEF DESCRIPTION OF THE DRAWINGS

Exemplary embodiments of the invention are illustrated in the drawing and explained in more detail in the following description. In the drawing.

DETAILED DESCRIPTION OF THE PREFERRED EMBODIMENTS

Figure 1:
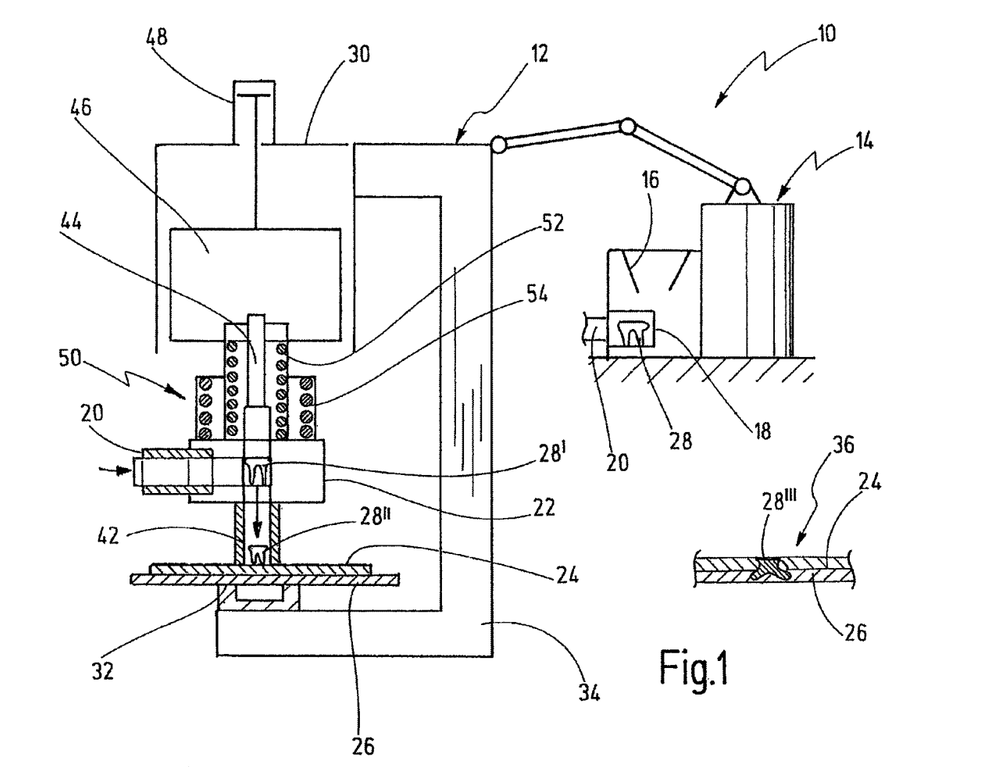
FIG. 1 shows a diagrammatic illustration of a joining arrangement for carrying out the inventive joining method.

A joining arrangement in the form of a self-piercing riveting device is illustrated diagrammatically in FIG. 1 and denoted in general by 10. The joining arrangement 10 comprises a joining head 12 which either can be mounted in a stationary fashion or can be moved by means of a robot 14. Furthermore, the joining arrangement 10 has a singulation device 16 for singulating joining components, and a feeder arrangement 18. The feeder arrangement 18 includes a feeder hose 20 via which the singulated joining components can be fed from the singulating device 16 to the joining head 12, for example by means of air blast. Alternatively, a feeder arrangement can, however, also have a magazine on the joining head, which is used to transfer singulated joining components automatically into a holder or receiver 22.

Provided in the joining head 12 is the receiver 22 in which a joining component can be picked up from an air-blast or a magazine feeder arrangement.

The joining arrangement 10 serves to connect a first workpiece 24 and a second workpiece 26 which, for example, can be designed as metal sheets, but can also be designed to connect a joining component to a workpiece. Furthermore, the joining arrangement can also be designed as a clinching arrangement.

A singulated joining component situated shortly before being fed to the joining head 12 is shown in FIG. 1 at 28. Shown at 28' is a joining component which has been introduced into the receiver 22 of the joining head 12 via the feeder hose 20.

The joining component is firstly brought out of the receiver 22 into an initial joining position in which it rests on the top side of the upper one of the two workpieces 24, 26. This is shown at 28". The joining head 12 includes a punching tool 30. The receiver 22 is a component of the punching tool 30. Furthermore, the joining head 12 has a die 32 which is connected to the punching tool 30 via a rigid C bracket 34.

As has been said, the joining head 12 is designed as a self-piercing riveting head and serves to produce a joined connection such as is illustrated schematically at 36 in FIG. 1. It is shown in the joined connection 36 that the joining component 28''' is deformed such that it rigidly interconnects the two workpieces 24, 26. Details of the self-piercing riveting process are generally known, and so will not be considered in detail in the present case.

The punching tool 30 includes a hold-down 42 which is pressed in the course of a joining operation onto a top side of the upper workpiece 24 in order to fix the arrangement composed of the two workpieces 24, 26 between the punching tool 30 and the die 32 on the underside of the lower workpiece 26.

Furthermore, the punching tool 30 has a punch 44 which can be moved relative to the hold-down 42. The punch 44 is connected to a punch holder 46 which can be moved by means of a schematically indicated lifting apparatus 48 on the punching tool 30 in a joining direction which is illustrated in FIG. 1 by an arrow. A spring arrangement 50 is arranged between the holder 22, which is rigidly connected to the hold-down 42. The spring arrangement 50 is designed as a two-stage spring arrangement having a compression spring 52 with a relatively low spring constant, and a hold-down spring 54 with a relatively large spring constant.

In order to carry out a joining operation, the hold-down 42 is firstly mounted on the top side of the upper workpiece 24. Subsequently, the punch 44 is moved by means of the lifting apparatus 48 in the direction of the workpieces 24, 26. The profile occurring thereby of the force to be exerted by the lifting apparatus 48 plotted against the travel (relative travel between the punch 44 and hold-down 42/receiver 22) is illustrated diagrammatically in FIG. 2.

Figure 2:
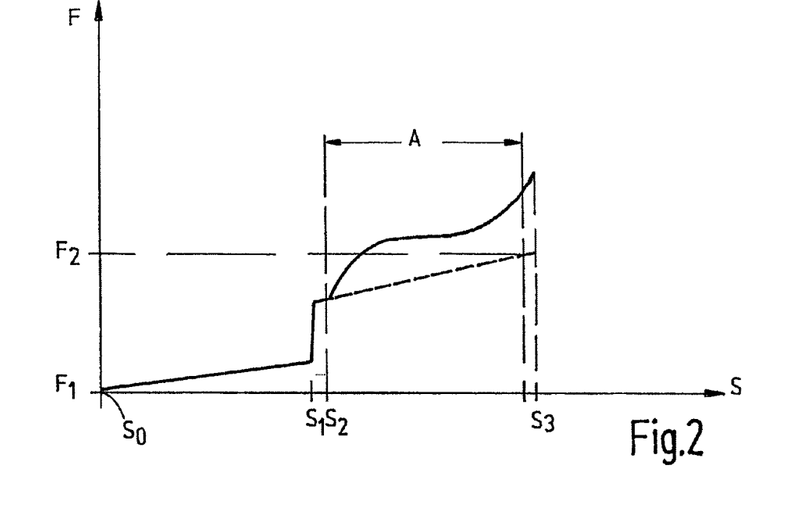
FIG. 2 shows a diagram of force against travel for an inventive joining method.

Here, a position $S_0$ corresponds to the position of the punch 44 which is shown in FIG. 1, a joining component 28' being located in the receiver 22. Upon subsequent depression of the punch holder 46, the punch 44 is moved downwards, thus shifting the joining part 28' into the initial joining position, which is shown at 28". The compression spring 52 is compressed thereby. This travel section is terminated at $S_1$. At this instant, the hold-down spring 54 comes into engagement and presses the hold-down 42 with a relatively great force against the top side of the upper workpiece 24. Starting from the instant $S_2$, the punch 44 presses the joining component 28" with a yet greater force into the workpiece arrangement in such a way that a hollow section of the joining component 28" penetrates into the workpiece arrangement and is deformed in the process. A final position $S_3$ of the punch 44 is, for example, reached when the top side of the joining component 28''' terminates flush with the top side of the upper workpiece 24 as is shown on the right in FIG. 1. However, it is also possible to set other rivet setting depths in the case of which the top side of the joining component 28 projects a little over the top side of the upper workpiece 24.

FIG. 2 further shows with dashes the linear characteristic of the hold-down spring 54. In relation to the diagram of FIG. 2 it may be noted that the gradients shown there for the characteristics are not true to scale for reasons of an illustration which is simple and comprehensible.

It is also shown in FIG. 2 that the force/travel characteristic can be monitored in a segment A between the travel points $S_2$ and $S_3$.

Figure 3:
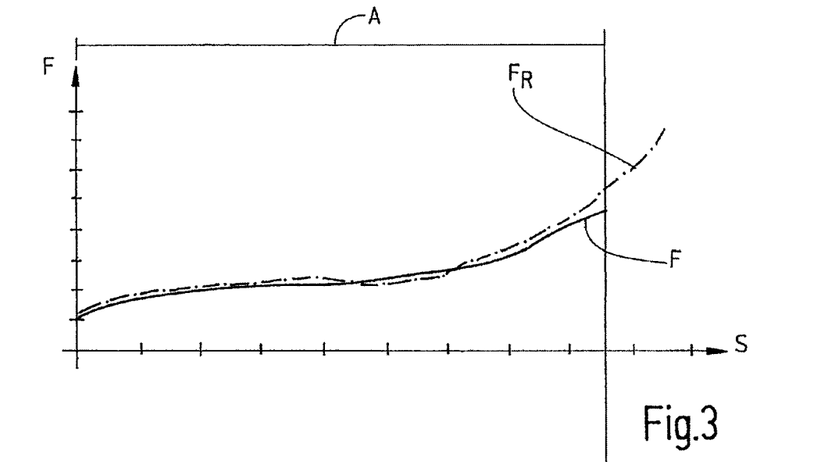
FIG. 3 shows a segment of the joining method of FIG. 2.

This is illustrated in more detail in FIG. 3, the profile of the force F plotted against the travel S being drawn in diagrammatically. Furthermore, FIG. 3 shows a diagrammatic reference force profile $F_R$ of an exemplary joining operation carried out previously.

It is seen in FIG. 3 that the force profile F approximately corresponds to the reference force profile $F_R$ virtually up to the end. It is only near the end of the segment A that large deviations arise.

Figure 4:
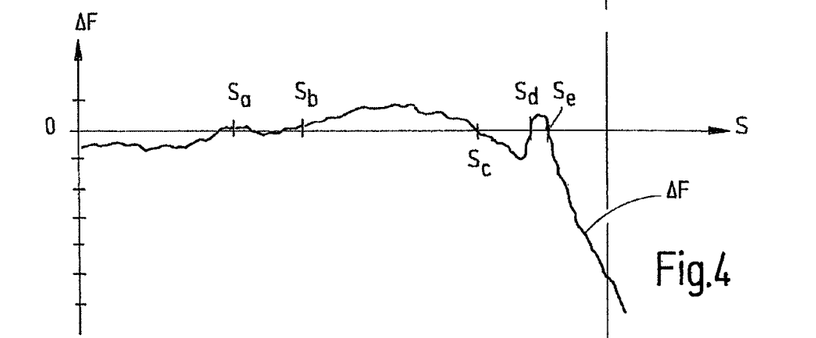
FIG. 4 shows a difference profile between a force profile and a reference force profile.

The difference between the force profile F and the reference force profile $F_R$ is depicted in FIG. 4 (in an enlarged fashion). This difference profile is denoted by $\Delta F$ in FIG. 4. It is seen that a negative deviation results up to a travel $S_0$. In the case of the travel point $S_a$, the difference $\Delta F$ is approximately equal to 0. Subsequently, a negative deviation results again up to $S_b$. Subsequently hereto, a positive deviation results up to $S_c$. From $S_c$ to $S_d$ a negative deviation results, in turn. A short positive deviation results from $S_d$ to $S_e$. An ever larger negative deviation results from $S_e$ up to the end of the segment A (at $S_g$).

Figure 5:
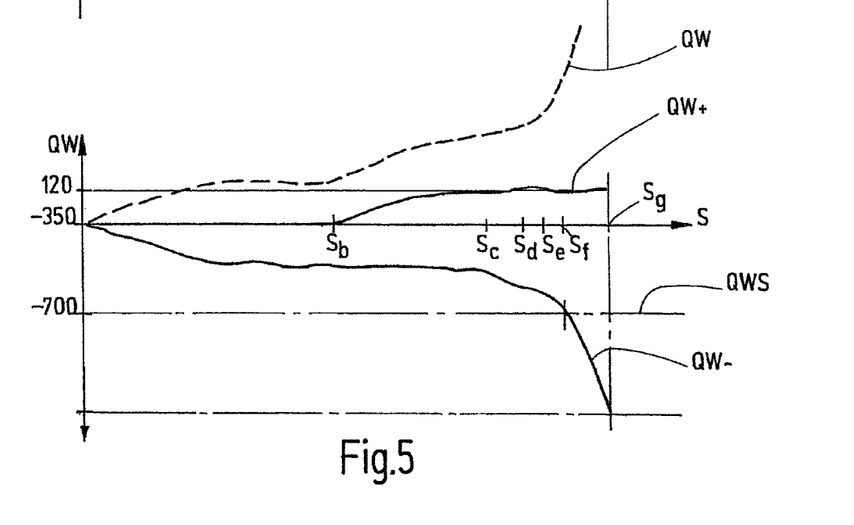
FIG. 5 shows a diagram illustrating how a quality value is determined by integration.

In order to determine a quality value numerically from this difference profile $\Delta F$, the difference profile $\Delta F$ is integrated numerically. This is shown in FIG. 5. Shown with dashes in FIG. 5 is a curve QW which corresponds to the respective integral value of the difference profile $\Delta F$. In this case, the absolute value of the difference profile $\Delta F$ is integrated so as to produce a continuously increasing profile of the quality value QW.

It goes without saying in this case that the quality of a joined connection monitored in this way is higher the smaller the quality value.

In the present case, the quality value QW becomes ever larger towards the end. The final value of the integral reached towards the end of the segment A, which represents the actual quality value, is no longer plotted in FIG. 5.

A joining operation is preferably monitored by virtue of the fact that a first quality value is formed by integrating positive value segments of a difference profile ΔF. This is shown in FIG. 5 at QW+. A second quality value QW− is determined by integrating negative value segments of the difference profile ΔF. It is to be seen in FIG. 5 that the positive quality value QW+ has a value of approximately 120 towards the end of the segment A (at $S_g$). By contrast, the negative quality value QW− has a negative value of −700, a value which is substantially larger than a quality threshold value QWS of −350 (which is reached at $S_f$ in FIG. 5).

The positive quality threshold value can, for example, lie at +350, but can also be smaller or larger, and is not illustrated in FIG. 5. The numerical data are understood purely in exemplary fashion and are in no way restrictive.

The result of the monitoring of a joining operation is therefore in this example a pair composed of a positive quality value QW+ (in this case 120) and a negative quality value QW− (in this case −700).

By means of comparison with respective quality threshold values, the quality values can be used to determine whether the joining operation conducted is acceptable or not acceptable in terms of quality.

Figure 6:
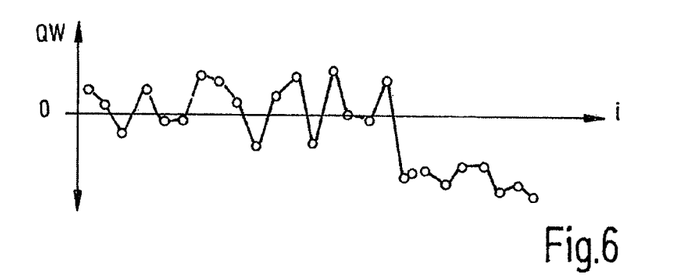
FIG. 6 shows a diagram of quality value plotted against the number of a plurality of joining operations carried out.

The respective quality value QW is depicted in FIG. 6 for a number i of joining operations carried out repeatedly. It is to be seen that this quality value firstly fluctuates about the value 0 in an essentially statistical fashion, but remains permanently in the negative range towards the end. By way of example, it is possible therefrom to read a trend in a simple fashion, to the effect that the quality of the joining operation repeatedly carried out deteriorates more and more.

Figure 7:
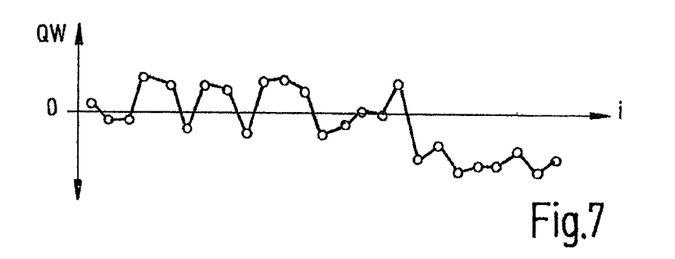
FIG. 7 shows a diagram, comparable to FIG. 6, of a different type of joining operation.

A similar example is shown in FIG. 7, which shows by way of example another type of joining operation carried out by means of the same joining tool. In the case of the other joining operation, it is possible, for example, to make use of another joining component, other sheet metal thicknesses and/or other workpiece materials.

A certain trend towards a deterioration in the relevant joining operation is also to be detected in the case of the profile of the quality value shown in FIG. 7.

By numerically detecting the quality of the joining operation in the form of the respective quality value, it is also possible when carrying out different joining operations by means of the same joining tool to perform a trend analysis which relates not only to one of the different joining operations, but to the joining tool as a whole. This is shown in FIG. 8.

Figure 8:
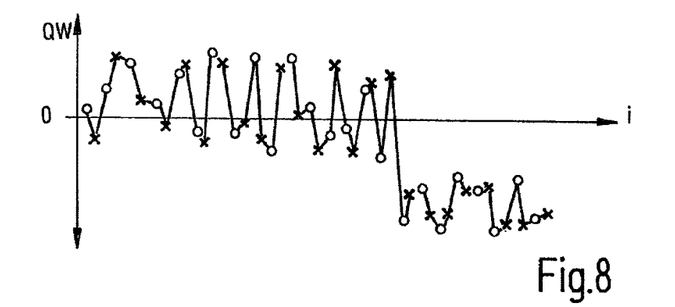
FIG. 8 shows a diagram of quality value plotted against the number of the joining operation of a plurality of different joining operations which are carried out repeatedly.

FIG. 8 shows the use of a joining tool always carrying out alternately a first joining operation (indicated by a circle) and a second joining operation (indicated by an x). It is evident from the illustration of FIG. 8 that overall a trend is developing towards a negative quality value. This indicates that a quality problem not restricted to a single joining operation exists with the joining tool. The point is that where only a single joining operation were concerned, the curve in FIG. 8 would run apart, for example with stochastic deviations above the value 0 for one joining operation (circle) and, by contrast, with a significant deviation for the other joining operation (for example x).

It goes without saying that illustrations corresponding to FIGS. 6 to 8 can also be created for the quality values QW+ and QW−, either separately in each case or in a diagram.

Figure 9:
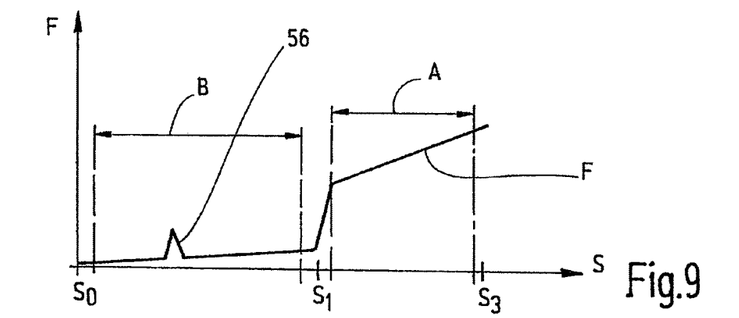
FIG. 9 shows an illustration, corresponding to FIG. 2, of force against travel for the purpose of explaining the force profile in the case of shifting of a tilted joining component.

FIG. 9 shows a further possibility of applying the inventive joining method. When the joining component 28 is shifted from the position in the receiver 22 (shown at 28' in FIG. 1) to the initial joining position (shown at 28" in FIG. 1), a curve with a linear profile whose gradient depends substantially on the spring constant of the compression spring 52 normally results in a segment B, shown in FIG. 9, of the force profile.

However, to the extent that a joining component is tilted in the receiver 22 (for example rotated by 90°), this joining component is deformed when being moved into the initial joining position 28", and this leads to a force peak 56, which is indicated in FIG. 9 diagrammatically.

Applying the inventive method when such a force peak 56 occurs, results in a quality value for the segment B of the force profile which differs significantly from the quality value which is determined when a joining component is shifted in the correct position.

The invention claimed is:

1. A joining method for connecting at least two workpieces, comprising:
    recording a force profile (F) of a force exerted by a joining tool during a joining operation,
    comparing the force profile (F) with a reference force profile ($F_R$),
    determining a difference profile (ΔF) between the force profile (F) and the reference force profile ($F_R$), and
    mapping numerically at least one segment (A, B) of the difference profile (ΔF) onto a quality value (QW) to check the quality of the joined connection produced;
        wherein the mapping includes a first mapping which maps positive value segments of the difference profile (ΔF) onto a first quality value (QW+) that is compared to a first quality threshold value (QWS+), and a second mapping which maps negative value segments of the difference profile (ΔF) onto a second quality value (QW−) that is compared to a second quality threshold value (QWS−).

2. The joining method according to claim 1, wherein the mapping includes an integration of the difference profile (ΔF).

3. The joining method according to claim 1, wherein the mapping includes a sum of power values of the difference profile (ΔF).

4. The joining method according to claim 1, wherein the joining operation is carried out repeatedly, and the respective quality values (QW) are represented in a diagram of quality values plotted against the number (i) of the joining operation.

5. The joining method according to claim 1, wherein a plurality of different joining operations are carried out repeatedly, and the respective quality values (QW) are represented in a diagram of quality values plotted against the number (i) of the joining operation.

6. The joining method according to claim 1, wherein the mapped segment of the difference profile includes a segment (A) in which a deformation of a workpiece used in the joining operation is performed by means of the joining tool.

7. The joining method according to claim 1, wherein the mapped segment of the difference profile includes a segment (B) in which a joining component to be used during the joining operation is shifted into an initial joining position by means of the joining tool.

8. The joining method according to claim 7, wherein the joining tool is moved by means of an actuator arrangement to shift the joining component into the initial joining position.

9. The joining method according to claim 2, wherein the mapping includes a sum of power values of the difference profile (ΔF).

10. The joining method according to claim 4, wherein a plurality of different joining operations are carried out repeatedly, and the respective quality values (QW) are represented in a diagram of quality values plotted against the number (i) of the joining operation.

* * * * *

UNITED STATES PATENT AND TRADEMARK OFFICE
CERTIFICATE OF CORRECTION

PATENT NO. : 9,089,892 B2
APPLICATION NO. : 13/733938
DATED : July 28, 2015
INVENTOR(S) : Michael Bloecher Page 1 of 1

It is certified that error appears in the above-identified patent and that said Letters Patent is hereby corrected as shown below:

On the title page, item 30, insert the following heading and information:

-- Foreign Application Priority Data

Jul. 7, 2010   (DE) ......... 10 2010 027 195.0 --.

Signed and Sealed this
Twelfth Day of January, 2016

Michelle K. Lee
*Director of the United States Patent and Trademark Office*